United States Patent [19]
Holan

[11] 3,864,405
[45] Feb. 4, 1975

[54] 1,1-BIS-(PHENYL)-2-NITROPROPANES

[75] Inventor: George Holan, Brighton, Victoria, Australia

[73] Assignee: Commonwealth Scientific and Industrial Research Organization, Campbell, Australia

[22] Filed: Dec. 20, 1973

[21] Appl. No.: 426,592

Related U.S. Application Data

[62] Division of Ser. No. 174,265, Aug. 23, 1971, Pat. No. 3,823,192.

[30] Foreign Application Priority Data

Aug. 31, 1970 Australia.............................. 2367/70
Feb. 5, 1971 Australia.............................. 3947/71
Feb. 12, 1971 Australia.............................. 4010/71

[52] U.S. Cl............................................. 260/609 F
[51] Int. Cl............................................. C07c 149/32
[58] Field of Search..................... 260/609 E, 609 F

[56] References Cited
UNITED STATES PATENTS

3,095,456  6/1963  Hodge et al..................... 260/609 F
3,823,192  7/1974  Holan et al..................... 260/609 E

*Primary Examiner*—Lewis Gotts
*Assistant Examiner*—D. R. Phillips
*Attorney, Agent, or Firm*—Bacon & Thomas

[57] ABSTRACT

New Insecticides comprising 1,1-bis(4-substituted phenyl)-2-nitropropanes,-2-nitrobutanes and -2- methyl-2-nitropropanes wherein the 4-substituents of the phenyl radicals are non-identical lower alkoxy groups, or identical or non-identical alkylthio groups, and such compounds wherein one of the 4-substituents is replaced by a 3,4-methylene-dioxy group.

These compounds are prepared by condensing the appropriate p-substituted-benzaldehyde with the appropriate nitro-alkane and reacting the carbinol product with the appropriately substituted benzene.

3 Claims, No Drawings

1,1-BIS-(PHENYL)-2-NITROPROPANES

This is a division, of application Ser. No. 174,265 filed Aug. 23, 1971 now U.S. Pat. No. 3,823,192.

This invention relates to new insecticidal compounds, and to new insecticidal compositions containing the compounds. The invention also includes methods for the preparation of the new compounds.

Throughout this specification, where the context permits, the word "insect" is used in its broad common usage and includes spiders, mites, nematodes and other pests which are not classed as insects in the strict biological sense. Thus the term implies reference not only to those small inverterbrate animals belonging mostly to the class Insecta, comprising six-legged, usually winged forms, such as beetles, bugs, flies and the like, but also to other allied classes of arthropods whose members are wingless and usually have more than six legs, such as spiders, centipedes, wool lice and the like, and especially to the order Acaridae which includes the mites and ticks. The words "insecticide" and "insecticidal" are similarly used.

The compounds provided by this invention have the general formula I

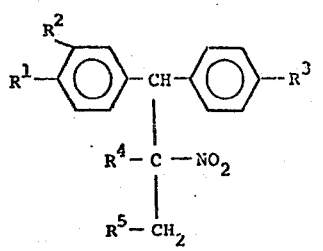

where
R$^1$ is a methoxy, ethoxy, propoxy, methylthio, ethylthio or propylthio group and
R$^2$ is hydrogen;

or
R$^1$ and R$^2$ together form a methylenedioxy group (i.e., —O—CH$_2$—O—;
R$^3$ is a methoxy, ethoxy, propoxy, methylthio, ethylthio or propylthio group;
with the proviso that R$^1$ and R$^3$ are not the same alkoxy group; and one of the groups R$^4$ and R$^5$ is hydrogen and the other of said groups is hydrogen or a methyl group.

The compounds of the invention have substantial insecticidal activity. Against DDT susceptible strains of housefly (*Musca domestica*), their activity is generally at least comparable with that of DDT and related insecticides. The compounds also can be potentiated to high activity levels even against resistant insect strains. It will be noted that the compounds contain no halogen and thus their insecticidal activity is of particular significance; firstly because the compounds are unlikely to give rise to any residue problems, and secondly, because the normal detoxification of halogenated insecticides (e.g., DDT) by dehydrochlorination cannot occur, the compounds are active against insects which are highly resistant to DDT. Furthermore the compounds generally have a low mammalian toxicity.

Preferred compounds are those in which one of the groups R$^1$ and R$^3$ is ethoxy, ethylthio or methylenedioxy.

Some preferred individual compounds provided by this aspect of the invention are:

| | |
|---|---|
| 1-p-ethoxyphenyl-1-p-methoxyphenyl-2-nitropropane | (Ia) |
| 1-p-ethoxyphenyl-1-p-propoxyphenyl-2-nitropropane | (Ib) |
| 1-p-ethoxyphenyl-1-p-ethylthio-phenyl-2-nitropropane | (Ic) |
| 1-p-ethoxyphenyl-1-(3,4-methylenedioxyphenyl)-2-nitropropane | (Id) | and the corresponding 2-nitro-n-butanes (Ic to Ih respectively and 2-methyl-2-nitropropanes (Ii to Il respectively).

| | |
|---|---|
| 1-p-ethylthio-1-(3,4-methylenedioxyphenyl)-2-nitropropane | (Im) |
| and the corresponding 2-nitro-butane | (In) |
| and 2-methyl-2-nitropropane | (Io) |

Known compounds related to the compounds I include the dimethoxy analogue of Ia, i.e., 1,1-bis(p-methoxyphenyl)-2-nitropropane, the unsymmetrical diethoxy analogue of Ia i.e. 1-o-ethoxyphenyl-1-p-ethoxyphenyl-2-nitropropane, and the compound 1,1-bis(p-ethoxyphenyl)-2-nitroethane, all of which have insignificant insecticidal acitvity as shown in the examples herein. In our copending Australian patent application No. 40745/68, filed 17th July, 1968, it is shown that the bis(p-ethoxy) analogues of compound Ia, i.e., 2,2-bis(p-ethoxyphenyl)-2-nitropropane and the corresponding analogues of compounds Ic and Ii have substantial and unexpected insecticidal activity. The activity of the compounds of this invention is generally higher than those of bis(p-ethoxy) compounds which is surprising in view of their assymetric pattern of substitution and their resemblance to known inactive compounds.

The invention also includes methods for the synthesis of the compounds I described herein, which methods are also applicable to the synthesis of the compounds described in our aforementioned copending application.

In accordance with this aspect of the invention, the compounds of formula I are prepared by a method which, in general terms, comprises the base catalysed addition of the appropriate nitroalkane with an appropriately substituted benzaldehyde in a suitable solvent to yield a carbinol which is further reacted with the same or another appropriately substituted benzene in the presence of an acid catalyst to give the final product.

More specifically in accordance with this aspect of the invention there is provided a method for the preparation of compounds of the formula I, as stated and defined above, which method comprises the steps of:

(a) condensing a benzaldehyde of the formula II

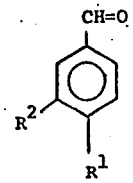

where R$^1$ and R$^2$ are as defined above, with a compound of the general formula III

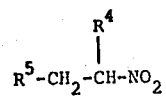

wherein
R⁴ and R⁵ are as defined above, the condensation being carried out in a suitable solvent and in the presence of a basic catalyst; and (b) reacting the carbinol produce resulting from step (a) with a compound of the formula IV

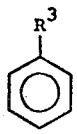

IV where R³ is as defined above in the presence of an acid catalyst.

The procedure may be modified by interchanging the substituents on the benzene rings of the starting compounds II and IV, e.g., by reacting the appropriate p-alkoxy or p-alkylthio benzaldehyde with the compound of formula III and then reacting the carbinol product with the appropriately substituted benzene, i.e., carrying the groups R¹ and R².

Approximately equimolar quantities of the major reactants are generally used but there may be advantages in employing up to a molar excess of the nitro compound III and compound IV.

The solvent/base system for step (a) of the above defined method is selected to satisfy the general criteria for carbanion-aldehyde type condensations of nitro-aliphatic compounds (the Henry reaction). The usual systems for such condensations include bases in water, such as the alkaline hydroxides; strong organic bases, such as piperidine or other secondary or tertiary cyclic or acyclic amines in protonic or aprotic solvents; and alkali metal alkoxides in alcohols or other aprotic or polar solvents.

However, we have found that care must be taken in selecting suitable systems as, unless high yields of the carbinol product of step (a) are obtained, the second condensation step (b) may not give the desired product. The process of the present invention appears to be an exception to the general applicability of the Henry reaction, as p-ethoxybenzaldehyde and related aldehydes are non-reactive, presumably due to the stabilization of their structures by resonance. This is reflected in the inability of these compounds to form stable bisulphite adducts in aqueous solutions. As a result, the usual conditions for the Henry reaction result in extremely poor yields of the carbinols. For example, very poor yields result from reactions in water and from the use of ethanol as solvent with triethylamine, ammonium acetate or sodium methoxide as basic catalysts. Hence the use of a very strong organic tertiary base, such as 1,5-diazabicycio[4.3.0]non-5-ene or 1,5-diazabicyclo[5.4.0]-undec-5-ene, is regarded as essential for successful operation of the process of this invention. Selection of the solvent is also of considerable importance. If ethanol is used the yield of the carbinol is only about 25% and it is therefore preferred to use a solvent of moderate dielectric strength and weak nucleophilic properties, such as dimethylsulfoxide, as the solvent. The preferred reaction temperature of this system is from about 15° to 25°C.

An improved method for the preparation of these compounds is described in copending Application Ser. No. 174,267 "Method for preparing Nitro-Alkanes" filed 8-23-71. Now Abn.

In a further aspect the invention also provides general methods for the synthesis of the symmetrical compounds of formula I, i.e., where the phenyl ring substituents are identical alkylthio groups. In this method the appropriate bis-p-(hydroxyphenyl) compound of formula V

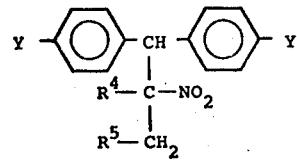

V where each of the groups Y is hydroxyl, is reacted with an N,N-dialkyl-substituted thiocarbamyl chloride (e.g. N,N-dimethylthiocarbamyl chloride) to form the thionocarbamate ester (i.e., formula V; Y= OCSN(Alk)₂; where Alk = a lower alkyl group).

These esters can be isomerised by heating to form the corresponding thiolocarbamate esters (i.e., formula V; Y = SCON(Alk)₂) which in turn are readily hydrolysed in alkaline solution to give the free thiophenols (i.e., formula V; Y = SH). The thiophenols can then be alkylated by any suitable known procedure, e.g., by reaction with the appropriate dialkyl sulphate or alkyl halide. The compounds of formula V where Y = OH can be prepared by any suitable method.

The compounds I are insecticidally active against houseflies, mosquitoes and other insects including the sheep blowfly and the Queensland cattle tick, both of which are serious pests in Australia. The compounds may be incorporated in a suitable inert solvent, or mixture of solvents, or in a solid mixture with other substances, such as wetting, dispersing and sticking agents. The compounds may be employed in such compositions either as the sole toxic agent or in combination with other insecticides, such as pyrethrum, rotenone, copper salts, etc., or with fungicidal or bactericidal agents, to provide compositions useful for household and agricultural dusts and sprays, textile coating and impregnation and the like. The compounds may be dissolved in suitable organic solvents to provide solutions of enhanced utility. The new compounds may also be placed in aqueous suspension by dispersing organic solvent solutions of the compounds in water. The new compounds may also be mixed with an inert, finely divided, solid diluent or carrier such as bentonite, bole, talc, charcoal, pumice, calcium carbonate and the like. The insecticidal compound may be admixed in its original form or in solution.

In particular, the compounds of the invention may be advantageously combined with other substances which have a synergistic or potentiating action. Generally such substances are of the class of mixed function oxidase inhibitors, i.e., they inhibit the detoxification of insecticides in insects produced by the action of oxidative enzymes. Typical substances of this tupe are the pyrethrin synergists such as piperonyl butoxide, piperonyl cyclonene, "Sesoxane" (sesamex) "Sulfoxide," n-propyl-isome and sesamine oil extractives. We have found that the substance 'Sesoxane' (made by Shulton Inc., Clifton, N.J., U.S.A.) is particularly useful as a potentiator. ('Sesoxane' is stated to be 2-(3,4-methylenedioxy-phenoxy)-3,6,9,-trioxaudecane). The amount of 'Sesoxane' used may vary from one one-thousandth to five times the weight of the compound I the preferred range being from about one one-hundredth to an equal part by weight. Piperonyl butoxide also is a useful potentiator in similar amounts.

It is to be understood that the invention includes all of the above mentioned compositions and other variations thereof as would be evident to persons skilled in the art.

The methods of preparation and the properties of the compounds I are illustrated by the following non-limiting examples.

EXAMPLE 1

Preparation of intermediate nitrocarbinols a. 1-(3,4-methylenedioxyphenyl) -2-nitropropanol.

Piperonal (90 g) was added to nitroethane (90 g) in dry dimethyl sulphoxide (180ml). 1,5 Diazabicyclo[4,3,0]-non-5-ene (0.5 g) was added. The mixture was reacted for 16 hrs then sodium bisulphite (110 g) in water (150 ml) was added and stirred for 1 hr. The mixture was quenched into water (2 l) and the organic layer was separated and washed with water. After drying with anhydrous sodium sulphate, residual nitropropane and dimethyl sulphoxide were removed under reduced pressure, yielding a yellow oil 117g.
Analysis — Found: C, 51.6; H, 4.8; N, 6.4. $C_{10}H_{11}NO_5$ requires C, 53.5; H, 4.9; N, 6.2

Similarly prepared were:

b. 1-(3,4-methylenedioxyphenyl)-2-nitrobutanol; from piperonal (90 g) and 1-nitropropane (107 g) yield 115 g, MP 98°–99°C. Analysis — Found: C, 54.8; H, 5.5; N, 5.5. $C_{11}H_{13}NO_5$ requires C, 55.2; H, 5.5; N, 5.9.

c. 1-(4-ethoxyphenyl)-2-nitropropanol:
from 4-ethoxybenzaldehyde (90 g) and nitroethane (90 g) yield 112 g, MP 69–71. Analysis — Found: C, 58.8; H, 6.7; N, 6.1 $C_{11}H_{15}-NO_4$ requires C, 58.7; H, 6.7; N, 6.2 d. 1-(4-ethoxyphenyl)-2-nitrobutanol:
from 4-ethoxybenzaldehyde (90 g) and 1-nitropropane (107 g) yield 106 g, MP 78°–80°. Analysis — Found: C, 60.1; H, 7.1; N, 5.9. $C_{12}H_{17}NO_4$ requires C, 60.2; H, 7.2; N, 5.9.

EXAMPLE 2

1-(4-ethoxyphenyl)-1-(4-ethylthiophenyl)-2-nitropropane 1-(4-ethoxyphenyl)-2-nitropropanol (11.3 g) was added over 1.5 hrs to ethyl phenyl sulphide (13.8 g) in 85% w/w sulphuric acid (50 g) maintained at 5°C. The mixture was reacted a further 1.5 hrs then quenched into ice water (500 ml). The organic layer was separated and washed with sodium bicarbonate solution and water. After drying with anhydrous sodium sulphate the excess of ethylphenylsulphide was removed under reduced pressure. The residue was crystallised from ethanol; yield 14.7 g, MP 72-3. Analysis — Found: C, 65.7; H, 6.7; N, 4.0; S, 9.1. $C_{19}H_{23}NO_3S$ requires C, 66.1; H, 6.7; N, 4.1; S, 9.3.

EXAMPLE 3

1-(4-ethoxyphenyl)-1-(4-ethylthiophenyl)-2-nitrobutane 1-(4-ethoxyphenyl)-2-nitrobutanol (12 g) was added over 1.5 hrs to ethyl phenyl sulphide (13.8 g) in 85% w/w sulphuric acid (50 g) maintained at 5°C. The mixture was reacted a further 45 minutes then quenched into ice water (500 ml). The organic layer was separated and washed with sodium bicarbonate solution and water. After drying with anhydrous sodium sulphate the excess of ethyl phenyl sulphide was removed under reduced pressure. The residue was crystallised from ethanol; yield 15.6 g MP 84.5°C. Analysis —Found: C, 66.6; H, 7.0; N, 3.6; S, 8.8. $C_{20}H_{25}NO_3S$ requires C, 66.8; H, 7.0; N, 3.9; S, 8.9.

EXAMPLE 4

1-(4-ethoxyphenyl)-1-(3,4-methylenedioxyphenyl) 2-nitropropane 1-(3,4-methylenedioxyphenyl)-2-nitropropanol (11.3 g) in dichloromethane (20 ml) was added over 1 hr to phenetole (12.2 g) in 85% w/w sulphuric acid maintained at 0°C. The mixture was reacted a further 30 minutes then quenched into ice water (500 ml). The organic layer was separated and washed with sodium bicarbonate solution and water. After drying with anhydrous sodium sulphate the excess of phenetole was removed under reduced pressure. The residue crystallised from ethanol; yield 12.6 g, MP 114.5°C. Analysis — Found: C, 65.7; H, 5.8; N, 4.0. $C_{18}H_{19}NO_5$ requires C, 65.6; H, 5.8; N, 4.3.

EXAMPLE 5

1-(4-ethoxyphenyl)-1-(3,4-methylenedioxyphenyl)-2-nitrobutane 1-(3,4-methylenedioxyphenyl)-2-nitrobutanol (12 g) in dichloromethane (20 ml) was added over 10 minutes to phenetole (12.2 g) in 85% w/w sulphuric acid maintained at −10°C. The mixture was reacted on additional 50 minutes then quenched into ice water (500 ml). The organic layer was separated and washed with sodium bicarbonate solution and water. After drying with anhydrous sodium sulphate the excess phenetole was removed under reduced pressure. The residue was crystallised from ethanol; yield 13.4 g, MP 100°–1°C. Analysis — Found: C, 66.2; H, 6.2; N, 3.8. $C_{19}H_{21}NO_5$ requires C, 66.5; H, 6.2; N, 4.1.

EXAMPLE 6

1-(4-ethoxyphenyl)-1-(4-methoxyphenyl)-2-nitrobutane.

1-(4-ethoxyphenyl)-2-nitrobutanol (3.6 g) was added over 30 minutes to anisole (3.24 g) in 85% sulphuric acid (7.5 mls) maintained at 0.5°C with vigorous stirring. The mixture was reacted an additional 30 minutes and then quenched into ice-water (80 ml). The organic layer was separated, washed with sodium bicarbonate solution and water and dried with anhydrous sodium sulphate. The solution was evaporated to dryness to yield, on crystallisation from ethanol, the product as crystals, melting at 93°C.

EXAMPLE 7

1-p-ethylthiophenyl-1-(3,4-methylenedioxyphenyl)-2-nitropropane.

11.3 g of 1-(3,4-methylenedioxyphenyl)-2-nitropropanol was dissolved in 20g of ethylthiobenzene and added over 1 hour to 50 g of 85% sulphuric acid cooled in an ice bath. The mixture was stirred for a further 2.5 hours and then quenched into 500 ml ice water. The organic layer was separated and washed with sodium bicarbonate solution and water. The residual oil was dried over sodium sulphate and then under vacuum and chromatographed in benzene over silica gel. Crystallisation from benzene/petroleum ether (b.p. 50° – 80°C) gave 4.9 g of 1-p-ethylthiophenyl-1-(3,4- methylenedioxyphenyl)-2-nitropropane, m.p. 62°–65°C.

EXAMPLE 8

1-p-ethylthiophenyl-1-(3,4-methylenedioxyphenyl)-2-nitrobutane 1-(3,4-methylenedioxyphenyl)-2-nitrobutanol (12g) was dissolved in warm ethylthiobenzene (20.0g) and added over 1 hour to 85% sulphuric acid (50g) maintained at 0°C. The mixture was stirred for a further 2 hours and then quenched into ice water (500 ml.). The product was worked up as in Example 7 to yield 6.6 g crystals melting at 60°C.

In all of the above examples NMR, IR and mass spectra were consistent with the named products.

the improved method of the invention is further illustrated by the following Examples, which show the large scale preparation of the compounds of our aforesaid copending application.

EXAMPLE 9 a. Preparation of 1-p-ethoxyphenyl-2-nitrobutan-1-ol p-Ethoxybenzaldehyde (450g) and 1-nitropropane (535g) were dissolved in 900 ml of dimethyl sulphoxide containing 2.5g of 1,5-diazabicyclo[4,3,0]non-5-ene and the mixture stirred at room temperature for 15 hours. The mixture was then poured into ice and, after ether extraction, yielded an oil containing 1-p-ethoxyphenyl-2-nitrobutan-1-ol. The infra-red spectrum of the product indicated the presence of about 15% by weight of the aldehyde stating material.

b. Purification of the carbinol

The impure product obtained as above was mixed with 450g of sodium metabisulphite to which 43 ml of water had been added. The solid was allowed to separate and the liquid phase decanted off and similarly treated with two further 450g amounts of the metabisulphite (plus water) over a total period of about 3 hours. The liquid product was then filtered or decanted. The IR spectrum then showed no carbonyl absorption at 1,680 cm$^{-1}$ and the product was considered aldehyde-free.

Crystallization from petroleum ether yielded crystals of the carbinol m.p. 62°C. IR and NMR spectrum confirmed the structure of the product as 1-p-ethoxyphenyl-2-nitrobutan-1-ol. The yield was 493g (68.8% of theoretical).

c. Preparation of 1,1-bis(p-ethoxyphenyl)-2-nitro-n-butane

The pure carbinol product obtained as above was added over 1½ hours to a reaction mixture consisting 488g of phenetole in 950 ml of 85% sulphuric acid at 0°–5°C. After a further two hours the mixture was quenched in ice and extracted with ether. The ether extract on evaporation gave a residue which was crystallized from ethanol to give 1,1-bis(p-ethoxyphenyl)-2-nitro-n-butane as a stable crystalline sold m.p. 82°C. The identity of the product was confirmed by molecular weight, IR and NMR. The yield was 75.5% of theory which represents an overall yield of 52% for the three-stage process.

EXAMPLE 10

Preparation of 1,1-bis(p-ethoxyphenyl)-2-nitrobutane from unpurified carbinol.

1-p-ethoxyphenyl-2-nitrobutan-1-ol was prepared as in the above example. 510g of the product, which was estimated by IR to be 70–75% pure, was added over two hours to a solution of phenetole (366g) in 85% H$_2$SO$_4$ (1,200 ml) keeping the temperature between 5° and 10°C. After stirring a further hour, the mixture was quenched and the product isolated. The product (852g) was mainly polymer, as indicated by NMR, with no biological activity.

EXAMPLE 11

Using the method described in Example 9, 1-p-ethoxyphenyl-2-nitropropan-1-ol was prepared from p-ethoxybenzaldehyde and nitroethane, purified and reacted with phenetole to give 1,1-bis(p-ethoxyphenyl)-2-nitropropane. Similar yields were obtained throughout and the product was a stable oil b.p. 150°C at 10$^{-4}$ Torr., identified by molecular weight, IR and NMR.

EXAMPLE 12

Preparation of 1,1-bis(p-ethoxyphenyl)-2-nitropropane without purification of the intermediate carbinol:

p-ethoxybenzaldehyde (450g) and nitroethane (450g) were added to 800 mls of dimethylsulphoxide containing 1,5- diazabicyclo[4,3,0]non-5-ene (1.5g) and stirred overnight. The mixture was quenched into 1 l. of water, separated with methylene dichloride and after washing with water the carbinol (671 g) was recovered by evaporation as an oil. A mixture of phenetole (732g) in 85% sulphuric acid (2,400 ml) was cooled to −10°C and the unpurified carbinol (670g) was added over 2 hours. The mixture was stirred for a further two hours and quenched into ice water. The solid product obtained corresponded to about an 80% yield. However, NMR examination indicated that it contained at least 70% of a polymeric material and its insecticidal testing showed no biological activity.

EXAMPLE 13

The procedure of Example 9 was repeated except that purification of the carbinol was effected by mixing with hydrazine hydrate in an amount equivalent to the amount of aldehyde present (found from the IR spectrum). After filtering off the solid azine formed, the purified carbinol was reacted with phenetole. A stable crystalline product was again obtained, the yields being similar to those in Example 9.

EXAMPLE 14

1-(4-ethylthiophenyl)-1-(4-methoxyphenyl)-2-nitrobutane

The carbinol 1-(4-methoxyphenyl)-2-nitrobutanol was prepared according to the method of Example 1 from 4-methoxybenzaldehyde (81 g) and nitropropane (107 g). The product was obtained as crystals m.p. 68°–9°C; yield 86%.

The carbinol (11.25 g) was dissolved in a mixture of ethylphenylsulphide (13.8 g) and dichloromethane (10 ml) and the mixture added during 1 hour to a vigorously stirred mixture of sulphuric acid (45 g) and water (5 g) in an ice bath. After a further 2 hours stirring the mixture was poured into 500 ml of ice water and oily phase separated. The aqueous phase was extracted with dichloromethane (2 × 25 ml) and the extracts were combined with the oily phase and washed with sodium bicarbonate solution (100 ml). The extract was dried over anhydrous sodium sulphate and the solvent and excess thioether removed by heating at 60°/0.1 mm Hg for 1 hour. The residue was crystallised from 96% ethanol, to give the crystalline product, mp 78°–9°; yield 84%.

EXAMPLE 15

Insecticidal Activity

The following tests method was used to determine the activities of the compounds of the foregoing Examples.

Tests were carried out on the common housefly, using a standard DDT-susceptible strain (WHO/IN/-Musca domestica/1). The compound was applied in an acetone solution by microsyringe to the dorsum of the thorax of two day old female flies reared from pupae of average weight 2.2 – 2.5 gm/100 pupae. The adult flies were fed on water and sugar-only diet and maintained at 26°C and 70% RH. The mortalities were counted at 48 hours after treatment and compared with acetone-treated controls. Flies unable to move or stand normally were considered dead. The $LD_{50}$ values obtained from a logit computer programme based on three replicates of 10 flies at each dose level are given in Table 1.

Potentiation

The above compounds were also tested on the insects described above in conjunction with the potentiator "Sesoxane" by applying 0.5 microlitres of 1% w/w acetone solution of "Sesoxane" with the compound under test.

The mortalities were counted at 48 hours after treatment and compared with acetone and acetone/potentiator controls.

The $LD_{50}$ values were determined as described above and the results are also given in Table 1.

TABLE 1

| Compound of Examples | $LD_{50}$ values (μg/insect) | |
|---|---|---|
| | Unpotentiated | Potentiated |
| *11 (a) | 0.48 | 0.06 |
| 4 | 0.14 | 0.019 |
| 2 | 0.16 | 0.015 |
| 5 | 0.12 | 0.028 |
| 7 | 0.35 | 0.018 |
| *9 (b) | 0.55 | 0.12 |
| 3 | 0.11 | 0.04 |
| 6 | 0.25 | 0.04 |
| 8 | 0.10 | 0.03 |
| *(c) | No significant activity at 12μg/insect | — |
| *(d) | No significant activity at 50μg/insect | — |
| *(e) | No significant activity at 100μg/insect | — |
| * DDT | 0.26 | 0.24 |

(* Figures given for comparison for (a) 1,1-bis(p-ethoxyphenyl) 2-nitropropane; (b) 1,1-bis(p-ethoxyphenyl)-2-nitro-butane; (c) 1,1-bis(p-methoxyphenyl)-2-nitropropane; (d) 1-(o-ethoxyphenyl)-1-(p-ethoxyphenyl)-2-nitropropane; (e) 1,1-bis(p-ethoxyphenyl)-2-nitroethane; and DDT.)

It will be noted that the closely related compounds (c) (d) and (e) above are essentially inactive as insecticides. Furthermore, it will be evident that the compounds of this invention have at least the same order of activity as DDT.

Also it will be seen that, at the specified concentration, "Sesoxane" increases the activity of the compounds of the invention very substantially. About the same levels of potentiation were obtained when "Sesoxane" was replaced by an equal amount of piperonyl butoxide. DDT is not potentiated to any significant extent by these substances.

EXAMPLE 16

The following are examples of insecticidal compositions in accordance with the invention. All parts are by weight.

a. Spray formulation

The following composition is adapted for spray application.

| Compound of formula I | 4.0 |
|---|---|
| "Sesoxane" or Piperonyl butoxide | 1.0 |
| Deodorized kerosene | 79.4 |
| Alkylated napthalene | 16.0 | b. Aerosol

The following materials are metered into a suitable 'bomb' container sealed and equipped with a valve in the usual way.

| Compound of formula I | 3.0 |
|---|---|
| Potentiator | 1.0 |
| Methylene chloride | 10.0 |
| 'Freon 12' | 43.0 |
| 'Freon 11' | 43.0 |

It will be appreciated that modifications may be made to the process of our invention as specifically described above, and it is to be understood that the invention includes all such modifications which fall within its spirit and scope.

I claim:

1. A compound of the formula:

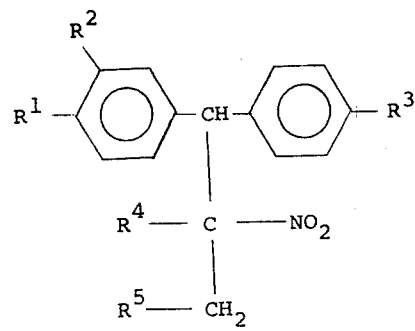

wherein R' is a methylthio, ethylthio or propylthio group; $R^2$ is hydrogen; $R^3$ is a methoxy, ethoxy, propoxy, methylthio, ethylthio or propylthio group; and one of the groups $R^4$ and $R^5$ is hydrogen and the other of said groups is hydrogen or a methyl group.

2. 1-p-ethoxyphenyl-1-p-ethylthiophenyl-2-nitropropane.

3. 1-p-ethoxyphenyl-1-p-ethylthiophenyl-2-nitrobutane.

* * * * *